United States Patent [19]

Nellums et al.

[11] Patent Number: 4,598,609
[45] Date of Patent: Jul. 8, 1986

[54] POSITIVE DRIVE

[75] Inventors: Richard A. Nellums, Union Lake; Eugene R. Braun, Royal Oak; Joseph C. Holtzhauser, Kalamazoo, all of Mich.

[73] Assignee: Eaton Corporation, Cleveland, Ohio

[21] Appl. No.: 602,995

[22] Filed: Apr. 23, 1984

[51] Int. Cl.$^4$ .......................................... F16H 35/04
[52] U.S. Cl. .................................................... 74/650
[58] Field of Search ....................... 74/650, 711, 710.5

[56] References Cited

U.S. PATENT DOCUMENTS

| | | | |
|---|---|---|---|
| 2,060,558 | 11/1936 | DeLauaud | 74/650 |
| 2,179,923 | 11/1939 | Lavaud | 74/650 |
| 2,720,796 | 10/1955 | Schow | 74/711 |
| 2,932,218 | 4/1960 | Russell | 74/711 |
| 2,978,929 | 4/1961 | Roberts | 74/711 |
| 3,146,842 | 9/1964 | Nelson et al. | 74/365 X |
| 3,195,371 | 7/1965 | Christie | 74/750 R X |
| 3,611,833 | 10/1971 | Baremor | 74/711 |
| 3,831,462 | 8/1974 | Baremor | 74/711 |
| 4,104,931 | 8/1978 | Tomich | 74/650 |
| 4,155,274 | 5/1979 | Dosio | 74/650 |
| 4,400,996 | 8/1983 | Schou | 74/650 |
| 4,488,454 | 12/1984 | Goscenski, Jr. | 74/650 |
| 4,498,355 | 2/1985 | Schou | 74/650 |
| 4,507,984 | 4/1985 | Goscenski, Jr. | 74/650 |
| 4,513,633 | 4/1985 | Goscenski, Jr. | 74/650 |
| 4,524,640 | 6/1985 | Neumann et al. | 74/650 |

FOREIGN PATENT DOCUMENTS 2119040 11/1983 United Kingdom .

Primary Examiner—Lawrence Staab
Assistant Examiner—David A. Novais
Attorney, Agent, or Firm—C. H. Grace; H. D. Gordon

[57] ABSTRACT

A positive drive (10) utilizing clutch sleeves (46, 62) having internal splines (48, 64) for splined connection to clutch cams (30, 32) and certain of the clutch (42, 44) friction discs (54, 66) is provided. The positive drive utilizes a drive cam (22) comprising a radially inner ring portion (24) carrying cam surfaces (84, 86) for operative engagement with cam follower ramp surfaces (88, 90) of the clutch cams and radially outwardly extending arm portions (26) for mounting to the positive drive housing (12). Each of the clutch sleeves define axially extending balking fingers (100, 102) which extend through the circumferential space between the arm portions of the drive cam and which are located radially outwardly of the ring portion (24) for interengagement to limit the relative rotational freedom between the clutch cams.

5 Claims, 8 Drawing Figures

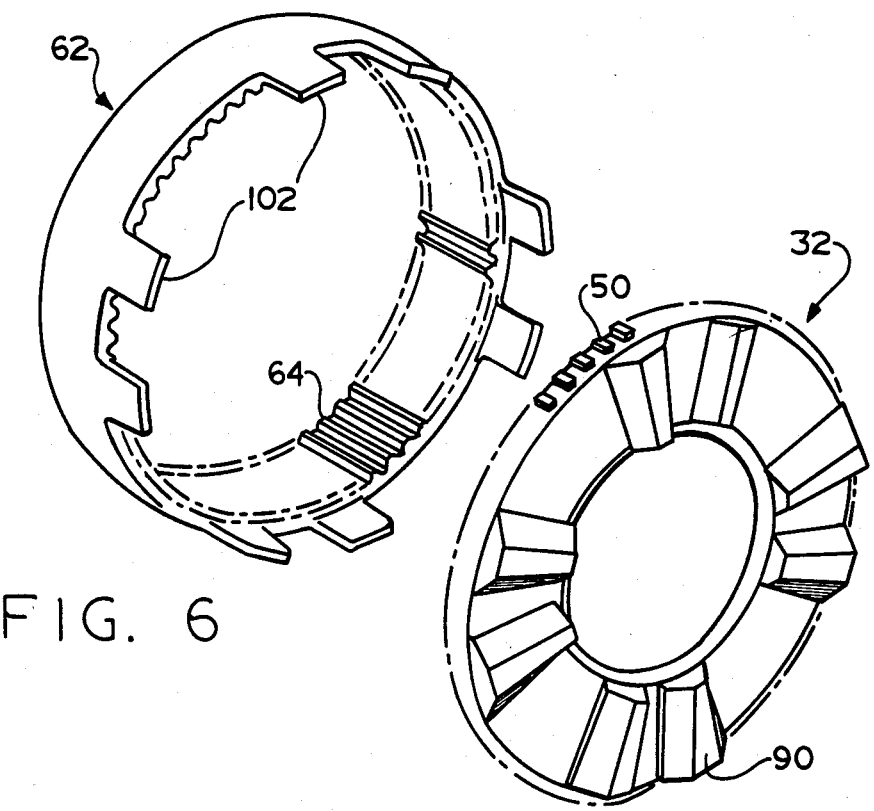
FIG. 6
FIG. 8
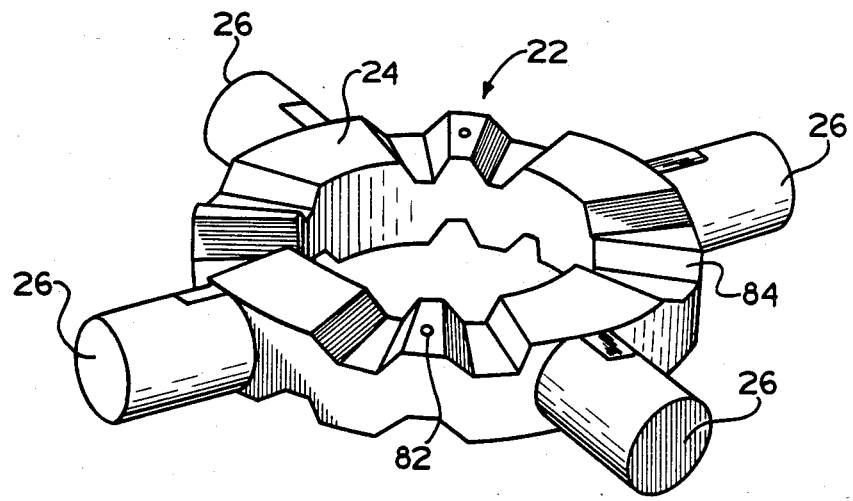
FIG. 7

4,598,609

POSITIVE DRIVE

BACKGROUND OF THE INVENTION

1. Field of the Invention

The present invention relates to traction modifiers of the positive drive type and in particular to an improved clutch sleeve-balking member structure for positive drive devices.

2. Description of the Prior Art

Traction modifying devices are well known in the prior art and are usually categorized as limited slip differentials, such as are illustrated in U.S. Pat. Nos. 3,611,833 and 3,614,717, locking differentials such as illustrated in U.S. Pat. Nos. 2,978,929 and 3,831,462 or positive drives. Traction modifying devices have become popular for use in the drive trains of vehicles between the vehicle transmission and the driven wheels. The primary function of a traction modifier is to facilitate driving on slippery surfaces and off-road conditions. Traction modifiers of the positive drive type are well known in the prior art and examples thereof are illustrated in U.S. Pat. Nos. 1,473,311; 2,060,558; 2,179,923; 2,720,796 and 4,400,996, and in published UK patent application GB No. 2,119,040A, the disclosures of which are all hereby incorporated by reference.

In general, a positive drive device includes an input member adapted to be driven by the input driving torque transmitted from the power source and first and second output members adapted to drive the vehicle wheels. First and second clutch means are operably associated with the first and second output members, respectively, and each of the clutch means has a disengaged mode and engaged mode. In the disengaged mode of the clutch means, its respective output member rotates relative to the input member, while in the engaged mode, the output member is maintained in the predetermined rotational relationship with the input member. First and second cam means are operably associated with the first and second clutch means, respectively, to move the respective clutch means from the disengaged mode to the engaged mode in response to movement of the cam means from a neutral position to an actuated position.

While the positive drive device described herein is utilized in a drive axle, positive drive devices are also well suited for use in power dividers between a series of tandem axles and/or in transfer cases between driven front and rear axle assemblies.

During substantially straight driving movement of a vehicle employing a positive drive, engine power is transmitted approximately equally to the driven wheels, which rotate at the same speed. During a potential spin-out condition, engine power is transmitted to the driven wheels in proportion to their instantaneous traction capability, whereby the wheels are still driven in the same speed.

When the vehicle employing a positive drive turns a tight corner, power is transmitted only to the slower moving (i.e., the inside) wheel, while the faster moving wheel is permitted to substantially free-wheel, relative to the input. When the vehicle is making a gradual turn, the positive drive drives both wheels at substantially the same speed and transmits slightly more power towards the inside wheel (which slips slightly) than to the outside wheel. Thus, a positive drive performs in a manner similar to an open differential during operating conditions which would make an open differential desireable, and performs in a manner similar to a rigid axle when operating conditions would make a rigid axle desireable.

It is an important feature of a positive drive that the device includes two clutches, preferably friction clutches, either of which may be engaged independently of the other and that engagement of the clutches is the means of torque transmission in the normal drive mode, and when there is a speed differential between the two outputs, only the clutch transmitting torque to the slower turning wheel is fully engaged. It is also known, see copending U.S. patent application Ser. No. 538,030, filed Sept. 30, 1983 and assigned to the same assignee as the present invention, now U.S. Pat. No. 4,554,845 that under certain conditions the clutch supplying torque to the faster rotating output should be applied with at least a minimum torque transmitting capacity for dampening purposes to minimize or eliminate so called "shutter" of the positive drive device.

Typically, the first and second clutches are applied by means of first and second clutch cams, respectively, which are axially moved to a clutch engaged position by means of a drive cam which interacts with the clutch cams by means of interacting ramp surfaces, balls provided in ramped cavities, or the like. As torque must be provided to the output member in both the forward and reverse modes of operation of the vehicle, each of the clutch cams will have first rotational position relative to the drive cam wherein the clutch cam is not axially displaced into a clutch engaging position and two positions corresponding to rotational displacement in both directions from the first position wherein the clutch cams will be axially displaced to a clutch engaging position. Accordingly, in operating conditions wherein it is desired to maintain one of the clutches in a disengaged condition, it is important to maintain the clutch cam associated therewith in the first position relative to the drive cam thereof. For this purposed, it is known to utilize interacting teeth or the like, usually referred to as "balking means", to limit the relative rotational freedom between the two clutch cams.

While the prior art traction modifiers of the positive drive type, especially those wherein the clutch driving the faster moving output member is applied with a predetermined torque capacity to minimize the problem of shutter, are highly functionally desireable, the prior art designs have not been totally satisfactory as nonstandard differential housings were required, the components of the prior art devices have been rather complicated and expensive to manufacture and/or assemble, and/or have utilized means to limit relative rotational movement between the two drive cams which are relatively complicated and expensive to produce and/or have been located radially inwardly of the interacting cam surfaces thus requiring an extremely high degree of manufacturing precision.

SUMMARY OF THE INVENTION

In accordance with the present invention, the drawbacks of the prior art have been minimized to the extent that a relatively simple and inexpensive positive drive type traction modifier is provided. The improved traction modifier is suitable for use in standard differential housings of the type normally utilized with standard open differentials. The improved positive drive of the present invention includes a generally annular tube-like clutch sleeve for each clutch, which clutch sleeve is provided with axially extending interior splines for mounting the clutch cam and a portion of the clutch discs to the sleeve member for rotation therewith and axial movement relative thereto. A plurality of stop or "balking" fingers are formed integrally with the sleeve and extend from each of the sleeves towards the clutch sleeve associated with the other clutch member for interaction therewith to limit relative rotational movement of the two clutch cams. As the so called stop or balking fingers extend from the sleeve member and are integral therewith, the fingers are at a relatively large diameter location whereat angular accuracy for a given manufacturing tolerance is greater.

Accordingly, it is an object of the present invention to provide an improved traction modifier of the positive drive type.

A further object of the present invention is to provided a positive drive utilizing clutch sleeves which rotationally carry the clutch cams and a portion of the clutch friction members and from which the interlocking stop fingers integrally extend.

These and other objects and advantages of the present invention will become apparent from a reading of the detailed description of the preferred embodiment taken in connection with the attached drawings.

BRIEF DESCRIPTION OF THE DRAWINGS

FIG. 6 is a perspective view of the clutch sleeve of the present invention.

FIG. 7 is a perspective view of the drive cam of the present invention.

FIG. 8 is a perspective view of the clutch cam of the present invention.

DETAILED DESCRIPTION OF THE PREFERRED EMBODIMENT

Figure 1:
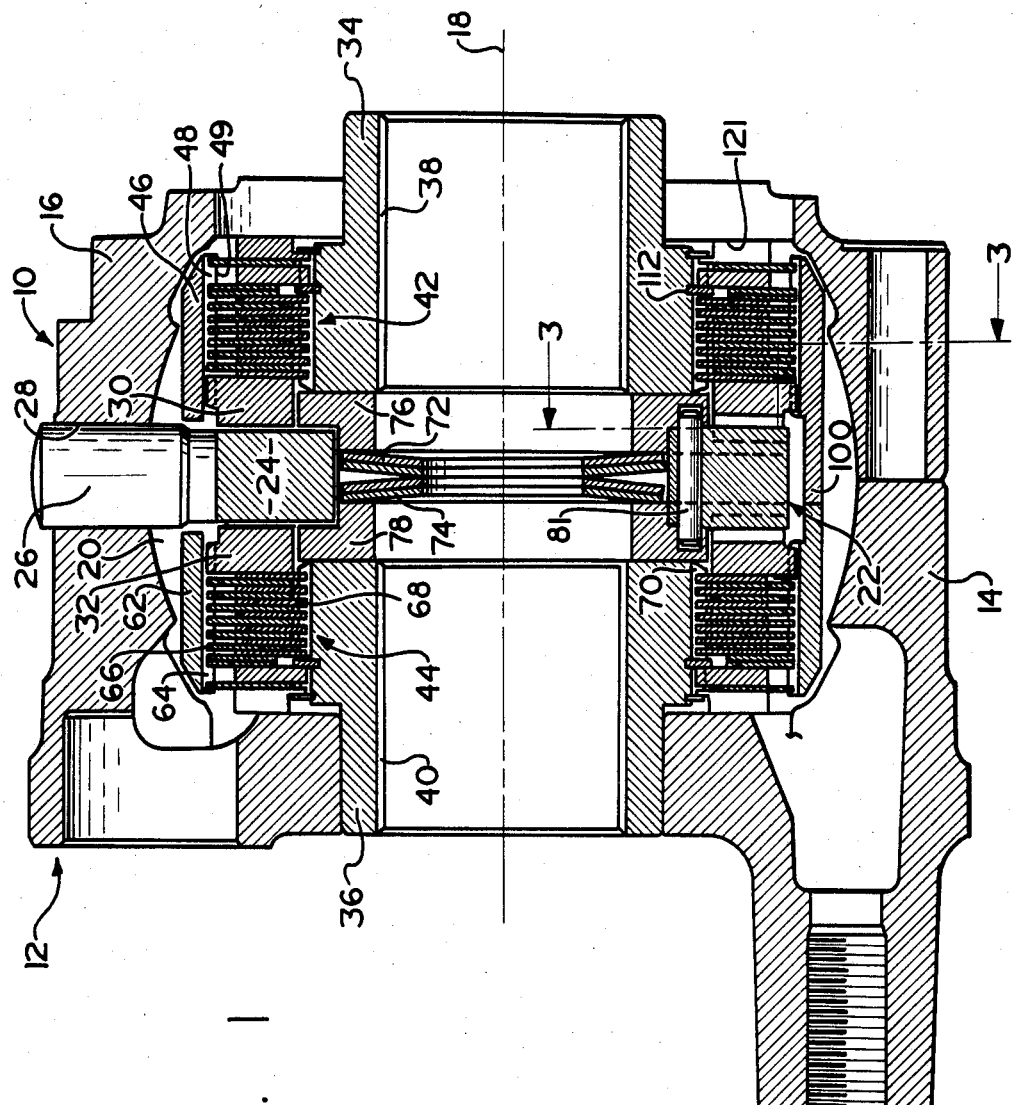
FIG. 1 is a plan view, in section, of the positive drive of the present invention taken substantially along line 1—1 in FIG. 3.

In the following description of the preferred embodiment certain terms will be used for convenience in reference only and are not intended to be limiting. The terms "upward", "downward", "rightward" and "leftward" refer to directions in the drawings to which reference is made. The terms "inward", and "outward", respectively, refer to directions towards and away from, respectively, the geometric center of the device being described. The above applies to the words above specifically mentioned, derivatives thereof and words of similar inport.

Figure 2:
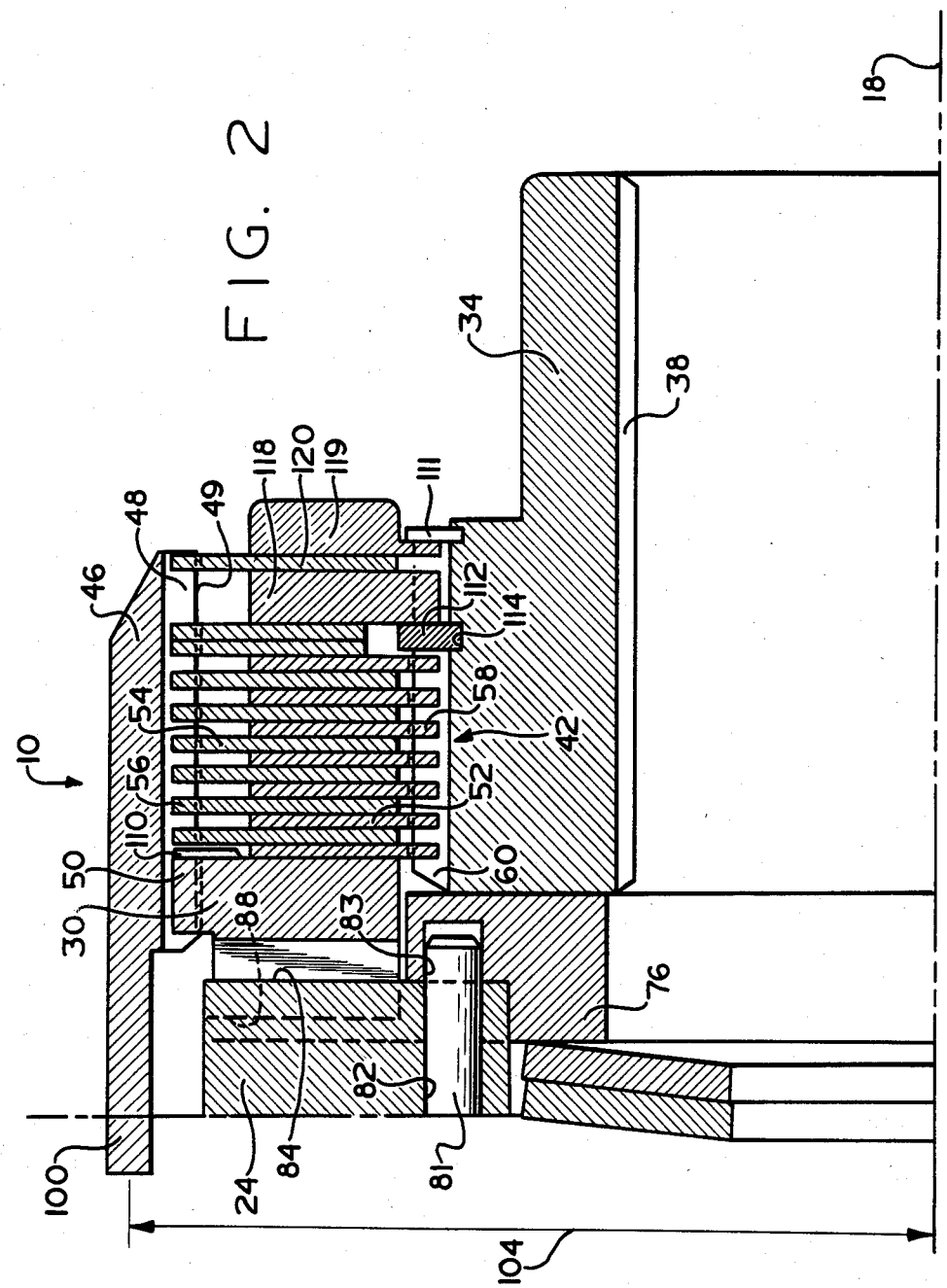
FIG. 2 is a partial, enlarged quarter view, in section of the positive drive illustrated in FIG. 1.
Figure 3:
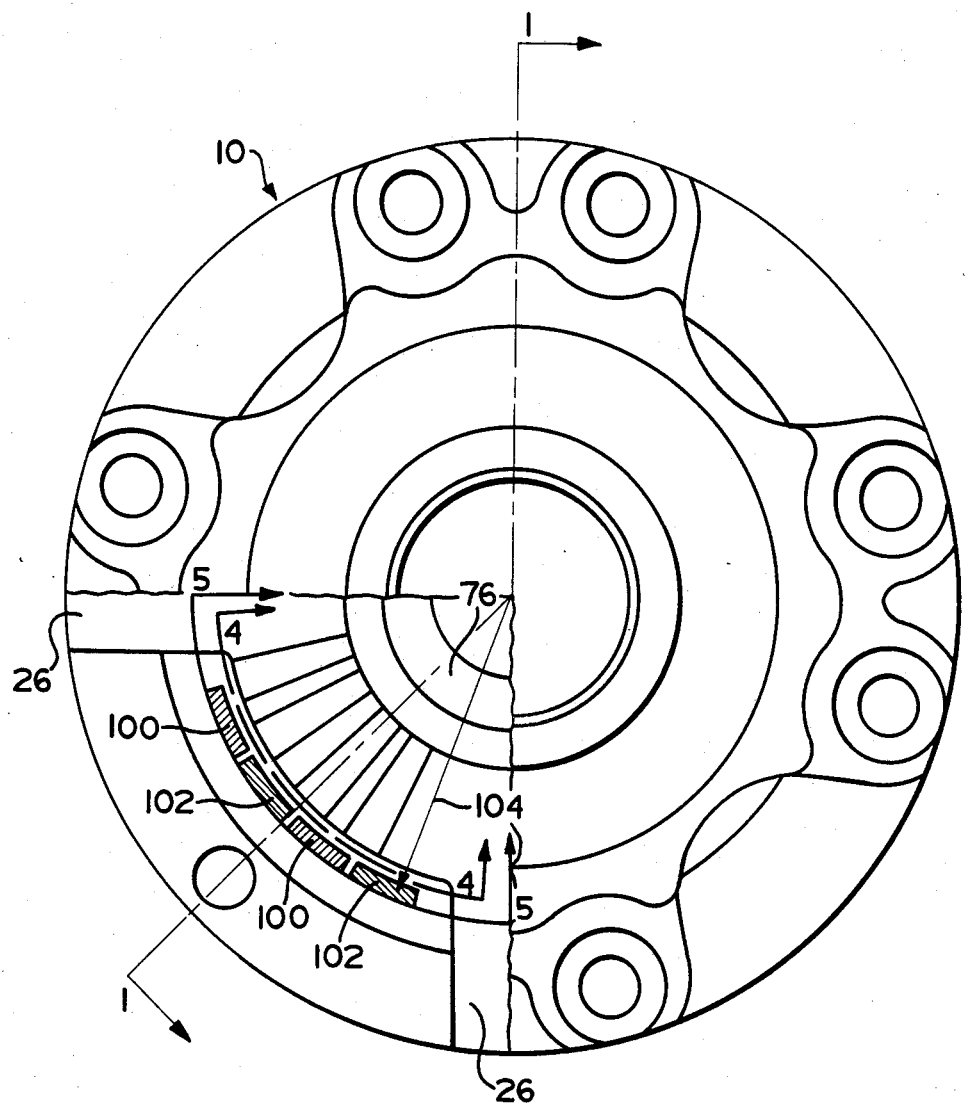
FIG. 3 is an end view, with a quarter view in section, taken substantially along line 3—3 in FIG. 1.
Figure 4:
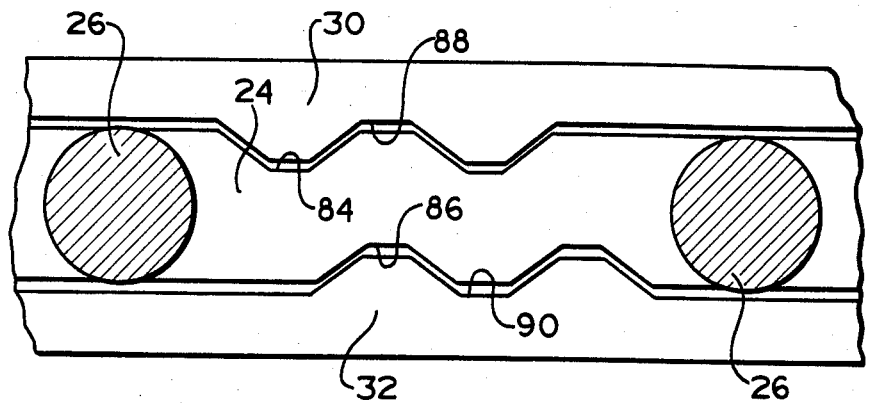
FIG. 4 is a radial view taken substantially along line 4—4 in FIG. 3.
Figure 5:
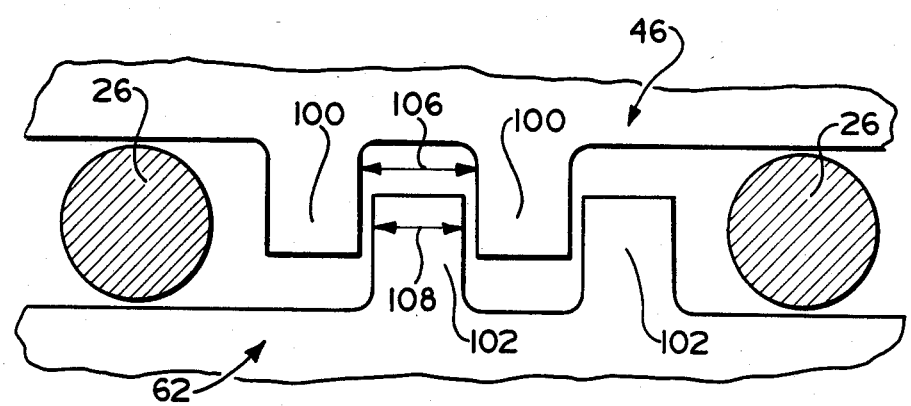
FIG. 5 is a radial view taken substantially along line 5—5 in FIG. 3.

The positive drive mechanism 10 of the present invention may be seen by reference to FIGS. 1-8 and includes a housing 12 which may comprise a lefthand portion 14 and a righthand portion 16 attached by bolts or other means (not shown). Preferably, housing 12 has an exterior and an interior configuration substantially similar, or identical, to the exterior configuration of standard differential housings such as are utilized in connection with single or multiple speed drive axles. Single and multiple speed drive axles, and the differential housings utilized therewith, are well known in the prior art and may be appreciated in greater detail by reference to U.S. Pat. Nos. 2,932,218; 3,146,842; 3,195,371 and 3,502,177, the disclosures of which are all hereby incorporated by reference. Briefly, as is well known in the prior art, housing 12 is typically drivingly connected to a ring gear (not shown) which in turn is drivingly associated with a drive pinion gear (not shown) driven by the propeller shaft (not shown) of a vehicle transmission (not shown). Accordingly, housing 12 is rotatable about axis 18 as a result of driving torque transmitted from the vehicle engine, through the transmission and drive shaft, and through the unshown drive pinion and ring gears. As stated above, the positive drive of the present invention may also be utilized with a power divider or transfer case.

Housing 12 defines an internal cavity 20 in which a centrally located drive cam 22 is located for joint rotation with housing 12. Drive cam 22, which is shown in FIG. 7, comprises an annular ring-like portion 24 and a plurality of radially outwardly extending arm members 26 which are generally equally circumferentially spaced about the ring portion 24 and are received within bores or notches 28 provided in the housing 12 to rotationally fix the drive cam to the housing. It may thus be seen that the mounting of drive cam 22 to the housing 12 is similar to the mounting of a conventional differential spider to the differential housing of a drive axle utilizing a conventional open bevel gear differential. It is understood, that other configurations of drive cam or drive cam mounting, such as splines or lugs, are possible within the scope of the present invention as may be seen by reference to published British Patent Application GB No. 2,119,040A.

Disposed on opposite sides of the drive cam 22 are a pair of clutch cams 30 and 32. Supported within the housing 12 for rotation about axis 18 relative to the housing are a pair of output coupling members 34 and 36. The output coupling members 34 and 36 define internal splines 38 and 40, respectively, which are adapted for engagement with sets of external splines defined by right and lefthand axle shafts (not shown) in a manner similiar, preferably identical, to that by which the side gears of a conventional differential are drivingly attached to axle shafts.

Disposed between clutch cam 30 and output coupling member 34 is a friction disc clutch assembly 42 and disposed between the clutch cam 32 and output coupling member 36 is a friction disc clutch assembly 44.

A generally tubular clutch sleeve 46 is provided with straight internal splines 48 in the interior bore 49 thereof which mesh with external splines 50 provided on the outer periphery of annular clutch cam 30. The friction clutch assembly 42 includes a plurality of alternatively interleaved or interdigitated generally flat clutch discs 52 and 54. Clutch discs 54 are provided with external splines 56 for splined engagement with internal splines 48 of the clutch sleeve 46 while clutch discs 52 are provided with internal splines 58 for splined engagement with external splines 60 provided on the outer periphery of output coupling member 34. In a similar manner, lefthand clutch sleeve 62 is provided with internal splines 64 for splined engagement with clutch cam 32 and clutch discs 66 while clutch discs 68 which are interleaved with clutch discs 66, are in splined engagement with exterior spline 70 provided on the lefthand output coupling 36. Preferably, clutch sleeves 46 and 62 are identical.

Resilient means, such as singular or stacked Belville washers 72 and 74, respectively, may be utilized to provide an outward axial bias to thrust washers 76 and 78, respectively, for purposes of providing an axially outwardly biasing force to the clutch cams 30 and 32, or to the clutches 42 and 44, and/or between the drive cam 22 and the output couplings 34 and 36, to preload same. For this purpose, thrust washers 76 and 78 are fixed for rotation with, but axial movement relative to, the drive cam 22 by means of pins 81 received in axially extending bores 82 and 83, respectively, provided in the drive cam and thrust washers, respectively.

Retaining rings 110 and 111 may be utilized to secure the friction clutches 42 and 44 in the sleeves 46 and 62. Ring 112, received in a groove 114 provided in the outer diameter surface of the couplings 34 and 36, may be utilized to react axial forces on the thrust washers and the couplings to axially outer friction leaves or discs 118, 119 and 120 and surface 121 on the housing for preload and/or dampening purposes.

The radially inward ring portion 24 of drive cam 22 defines a pair of axially opposite cam surfaces 84 and 86, respectively, for cooperation with ramped cam follower surfaces 88 and 90, respectively, provided on clutch cams 30 and 32, respectively. Preferably, the cam and ramp surfaces are of the "rise and fall" type now well known in the art and illustrated in greater detail in U.S. Pat. No. 3,831,462 the disclosure of which is hereby incorporated by reference. With so called cooperating rise and fall cam and ramp surfaces, rotation of the drive cam 22 relative to the clutch cams 30 and 32 results in engagement of the cam surfaces 84 and 86 with the ramp surfaces 88 and 90, respectively, and further relative rotation results in axial movement of clutch cam 30 to the right or clutch cam 32 to the left, respectively, which results in increasing frictional engagement of frictional clutches 42 and 44, respectively. When surfaces 84 and 88 and/or surfaces 86 and 90 are not engaged, friction clutches 42 and 44 are in the disengaged mode. It is understood that in the disengaged mode, clutches 42 and/or 44 may be partially engaged with a limited torque transfer capacity for preload and/or damping purposes.

In the engaged mode of clutches 42 and 44, respectively, drive torque is transmitted to output couplings 34 and 36, respectively, and the axle shafts drivingly connected thereto.

Although clutch cams 30 and 32 are shown as axially moveable relative to sleeves 46 and 62, respectively, it is understood that the clutch cams and respective sleeves can be axially fixed for joint axial movement relative to the clutch friction discs.

As is well known for positive drive traction modifiers of the type described, an important operational feature is that torque be applied substantially equally to the output couplings when the output couplings are rotating at approximatly equal speeds and that torque be applied to the slower rotating output coupling when the output couplings are rotating at substantially different speeds, such as would occur when a vehicle is in a turn or going around a corner. To assure that the output coupling associated with the faster rotating axle shaft is allowed to free wheel, the friction clutch associated therewith must be allowed to remain in the disengaged mode and the clutch cam associated therewith must be restrained from engagement with the trailing cam surface of the drive cam 22. To accomplish this, it is necessary that the two clutch cams, 30 and 32, be directly or indirectly rotationally connected with only a predetermined degree of rotational or angular freedom therebetween. By way of example, the angular freedom therebetween must be sufficient to allow the leading surfaces of cam surface 84 to engage ramp surface 88 while the leading surface of cam surface 86 is disengaged with ram surface 90 but insufficient to allow the leading surface of cam surface 84 to engage ramp surface 88 while the trailing surface of cam surface 86 simultaneously engages ramp surface 90. This requirement for rotational interconnection between the clutch cams with a predetermined degree of rotational freedom therebetween, i.e. balking means, is well known in the prior art and may be seen by reference to above mentioned U.S. Pat. Nos. 4,400,996 and 2,179,923. As it is desireable that an accurately known, preferably relatively small, relative rotation between the drive cam and clutch cam be required for engagement of a clutch, the rotational accuracy of the balking means must be relatively great.

In the present invention, to achieve rotational connection between the clutch cams 30 and 32, with a predetermined limited degree of rotational freedom therebetween, each of the clutch sleeves, 46 and 62, respectively, is provided with axially inwardly extending balking teeth or fingers 100 and 102, respectively, extending from the outer periphery therof and formed integrally therewith. As may be seen by reference to FIG. 5, the teeth 100 and 102 extend axially toward one another in the circumferential space between the arm portions 26 of the drive cam 22. As may be seen, lateral teeth 100 and 102 cooperate in an interengaged relationship to define a claw-coupling which has a certain degree of rotational freedom therebetween, which degree of rotational freedom is defined by the circumferential space or backlash between teeth 100 and 102 and the radial distance 104 between the interengaging teeth and the axis of rotation 18.

Accordingly, if the circumferential backlash B (toothspace 106 minus tooth thickness 108 at the pitch radius 104) between balking teeth 100 and 102 is known, and the pitch radius, R, of the balking teeth from the axis of rotation 18 is known, the rotational freedom RF, expressed in radians, between the clutch cams 30 and 32 resulting from balking finger backlash may be expressed as: $RF = B/R$. Of course, additional rotational freedom between the clutch cams may be provided at the clutch cam and clutch sleeve splined connection or the like.

It may also be seen, that by locating the balking teeth 100 and 102 at the greatest possible radius from axis of rotation 18, errors in the backlash B between the interegaging balking teeth 100 and 102 due to manufacturing tolerances and the like will have a minimized effect on the relative rotational free play between the clutch cam members 30 and 32. In the present invention, the interacting balking teeth 100 and 102 are formed integrally with clutch sleeves 46 and 62, respectively, and are located radially outwardly of the clutch cams and friction clutch assemblies thereby allowing a balking mechanism of high rotational accuracy for a given degree of manufacturing tolerance.

The clutch sleeves 46 and 62 are relatively simple tubular structures which are provided with internal splines and integral interengaging balking fingers or teeth thereon which balking fingers are formed at an outer diameter location where machining is relatively easier and wherein angular accuracy for a given degree of machining precision is greater. Additionally, as the clutch cams are separate pieces which are easily assembled to the clutch sleeves by means of a spline connection, the clutch cams and the relatively complex cam follower ramp surfaces carried thereby may be produced with relatively simple holding fixtures and the like without interference from any component attached thereto.

It has been found that the clutch sleeves of the present invention may be produced by relatively conventional, relatively less expensive manufacturing methods, such as milling, turning, hobbing and/or broaching, as opposed to the relatively more expensive methods of powder metal casting, forging or the like usually associated with the clutch cams.

Accordingly, an improved positive drive type traction modifier has been provided which utilizes clutch sleeves to retain the clutch cams and a portion of the clutch friction discs and which define axially inwardly extending integral balking teeth thereon. This structural improvement allows the relatively complex clutch cams to be formed separately and then easily mounted to the clutch sleeve by means of a splined connection and further allows the balking teeth to be formed at a relatively greater radius from the axis of rotation for maximized angular accuracy of the balking connection.

The present invention has been described in detail sufficient to enable one skilled in the art to practice same. Upon a reading and understanding of the Specification, certain modifications and alterations of the invention will become apparent to those skilled in the art, and it is intended that the invention include all such modifications and alterations, insofar as they come within the scope of the following claims:

We claim:

1. An improved positive drive of the type including a housing, a drive cam rotationally fixed to the housing, first and second output coupling members adapted to drive first and second shafts, first and second clutch means associated with said first and second output coupling members, each of said clutch means having a disengaged mode which allows its respective output coupling member to rotate relative to said drive cam member and an engaged mode which maintains a predetermined rotational relationship between said respective output coupling member and said drive cam member, first and second clutch cams having cam follower ramp surfaces for interaction with cam surfaces provided on said drive cam, said first and second clutch cams effective to engage and disengage said first and second clutch means, respectively, and balking means associated with said first and second clutch cam to limit the relative rotational displacement therebeteween, said positive drive characterized by;

a first and a second generally tubular clutch sleeve associated with said first and second clutch means and clutch cams, respectively, each of said clutch sleeves defining mounting means for engagement with its respective clutch cam to rotationally couple said sleeve and clutch cam, said mounting means comprising internal splines formed in said clutch sleeves for engagement with external splines formed on said clutch cams, said first and second clutch means each comprising a friction clutch pack comprising a set of first clutch discs having external splines formed on the radially outer peripheral thereof for splined connection with said internal splines carried by said clutch sleeve, said first clutch discs interleaved with second clutch discs rotationally fixed to said output couplings, at least one of said first and second clutch sleeves defining a plurality of balking teeth extending toward the other of said clutch sleeves for interengagement with balking teeth provided in the other of said first and second clutch sleeves to limit the rotational freedom between said first and second clutch cams, said balking teeth defined by integral axially extending portions of said tubular clutch sleeves and located radially outwardly of said cam follower ramp surfaces and said cam surfaces.

2. The improved positive drive of claim 1 wherein said drive cam defines a plurality of radially outwardly extending generally equally circumferentially spaced arms received in bores provided in said housing, said balking teeth extending through the circumferential space between said arms.

3. The positive drive of claim 1 wherein said drive cam comprises a generally annular radially inward ring-like portion carrying said cam surfaces on axially opposite surfaces thereof.

4. The positive drive of claim 1 wherein said second clutch members are provided with internal splines for splined connection with external splines formed on a hub portion of said output couplings.

5. The positive drive of claim 1 wherein said first and second clutch sleeves are substantially identical.

* * * * *